(12) United States Patent
Armour et al.

(10) Patent No.: US 9,141,345 B2
(45) Date of Patent: Sep. 22, 2015

(54) SIMPLIFIED USER CONTROLS FOR AUTHORING WORKFLOWS

(75) Inventors: David J. Armour, Bellevue, WA (US); Evan M. Keibler, Bellevue, WA (US); Sandy R. Wu, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 742 days.

(21) Appl. No.: 12/695,150

(22) Filed: Jan. 27, 2010

(65) Prior Publication Data

US 2011/0185315 A1    Jul. 28, 2011

(51) Int. Cl.
*G06F 3/048*    (2013.01)
*G06F 9/44*    (2006.01)

(52) U.S. Cl.
CPC ........................................ *G06F 8/34* (2013.01)

(58) Field of Classification Search
CPC ..... G06F 3/04847; G06F 8/34; G06Q 10/067; G06Q 10/0633
USPC .................. 715/853, 837, 712, 746, 755, 763
See application file for complete search history.

(56) References Cited

U.S. PATENT DOCUMENTS

| | | | | |
|---|---|---|---|---|
| 5,169,342 A | * | 12/1992 | Steele et al. | 434/112 |
| 5,255,181 A | * | 10/1993 | Chapman et al. | 705/7.25 |
| 5,630,040 A | * | 5/1997 | Furuya | 345/666 |
| 5,630,069 A | * | 5/1997 | Flores et al. | 705/7.27 |
| 5,684,963 A | * | 11/1997 | Clement | 705/26.41 |
| 5,786,816 A | * | 7/1998 | Macrae et al. | 715/837 |
| 5,841,959 A | * | 11/1998 | Guiremand | 345/440 |
| 5,850,221 A | * | 12/1998 | Macrae et al. | 715/853 |
| 5,999,911 A | | 12/1999 | Berg et al. | |
| 6,020,895 A | * | 2/2000 | Azami | 345/619 |
| 6,147,685 A | * | 11/2000 | Bliss et al. | 715/769 |
| 6,225,998 B1 | | 5/2001 | Okita et al. | |
| 6,334,193 B1 | | 12/2001 | Buzsaki | |
| 6,380,951 B1 | * | 4/2002 | Petchenkine et al. | 715/736 |

(Continued)

FOREIGN PATENT DOCUMENTS

| | | |
|---|---|---|
| CN | 1790241 A | 6/2006 |
| CN | 101364176 A | 2/2009 |
| CN | 101539861 A | 9/2009 |

OTHER PUBLICATIONS

Bing search q=workflow%20ediT%20group%20steps&qs May 27, 2015.*

(Continued)

*Primary Examiner* — Boris Pesin
*Assistant Examiner* — John Heffington
(74) *Attorney, Agent, or Firm* — Jim Banowsky; Kate Drakos; Micky Minhas

(57) ABSTRACT

A workflow design system provides user interface controls that allow a workflow author to focus on the steps of the workflow before deciding on how to control the flow of the workflow. With the system, an author can change the control flow of a workflow without re-ordering the sequence of steps within the workflow. The workflow design system allows the author to define a sequence of steps and then drag a control block over these steps to capture them within the control block. The author can also later remove the control block without affecting the sequence of steps if his needs change. In addition, the system presents error-handling workflows side-by-side with the main workflow, so that the author can modify the main workflow and notice the effects and any corresponding changes for error handling workflows at the same time.

17 Claims, 8 Drawing Sheets

(56) References Cited

U.S. PATENT DOCUMENTS

| | | | |
|---|---|---|---|
| 6,483,524 B1* | 11/2002 | Petchenkine et al. | 715/763 |
| 6,544,123 B1* | 4/2003 | Tanaka et al. | 463/36 |
| 6,563,512 B1* | 5/2003 | Azami et al. | 345/619 |
| 6,624,908 B1* | 9/2003 | Petchenkine et al. | 358/1.15 |
| 6,658,404 B1* | 12/2003 | Cecchini | 707/758 |
| 6,970,749 B1* | 11/2005 | Chinn et al. | 700/12 |
| 7,184,967 B1 | 2/2007 | Mital et al. | |
| 7,398,473 B2* | 7/2008 | Stoner et al. | 715/762 |
| 7,464,366 B2 | 12/2008 | Shukla et al. | |
| 7,549,128 B2* | 6/2009 | Snyder et al. | 715/792 |
| 7,562,085 B2* | 7/2009 | Bier et al. | 1/1 |
| 7,865,845 B2* | 1/2011 | Dettinger et al. | 715/863 |
| 7,870,184 B2* | 1/2011 | Bauer et al. | 709/201 |
| 7,983,943 B2* | 7/2011 | Morales et al. | 705/7.27 |
| 8,032,243 B2* | 10/2011 | Raviola et al. | 700/103 |
| 8,121,716 B2* | 2/2012 | Offenmuller | 700/97 |
| 8,151,202 B1* | 4/2012 | Cronin et al. | 715/764 |
| 8,156,431 B2* | 4/2012 | Kobashi | 715/272 |
| 8,355,928 B2* | 1/2013 | Spahn | 705/3 |
| 8,661,366 B2* | 2/2014 | Snyder et al. | 715/792 |
| 8,726,187 B2* | 5/2014 | Snyder et al. | 715/810 |
| 8,843,892 B2* | 9/2014 | Hamlin et al. | 717/123 |
| 8,868,353 B2* | 10/2014 | Parkhurst et al. | 702/22 |
| 8,898,442 B2* | 11/2014 | Stoitsev | 712/244 |
| 2002/0161772 A1 | 10/2002 | Bergelson et al. | 707/100 |
| 2003/0110185 A1* | 6/2003 | Rhoads | 707/104.1 |
| 2003/0142120 A1* | 7/2003 | Nii | 345/700 |
| 2003/0164817 A1* | 9/2003 | Graham et al. | 345/157 |
| 2004/0078105 A1* | 4/2004 | Moon et al. | 700/100 |
| 2004/0078776 A1 | 4/2004 | Moon et al. | |
| 2004/0194112 A1* | 9/2004 | Whittenberger et al. | 719/310 |
| 2004/0205600 A1* | 10/2004 | Kakuta et al. | 715/516 |
| 2005/0060252 A1* | 3/2005 | Doddington | 705/35 |
| 2005/0198591 A1* | 9/2005 | Jarrett et al. | 715/863 |
| 2006/0015380 A1* | 1/2006 | Flinn et al. | 705/7 |
| 2006/0036670 A1* | 2/2006 | Musman | 709/204 |
| 2006/0136833 A1* | 6/2006 | Dettinger et al. | 715/769 |
| 2006/0200756 A1* | 9/2006 | Politi et al. | 715/513 |
| 2006/0271883 A1* | 11/2006 | Bier et al. | 715/853 |
| 2007/0055557 A1* | 3/2007 | Kloppmann et al. | 705/7 |
| 2007/0094306 A1* | 4/2007 | Kyriazakos | 707/104.1 |
| 2007/0245297 A1* | 10/2007 | Kuester et al. | 717/104 |
| 2007/0299906 A1* | 12/2007 | Bose et al. | 709/202 |
| 2008/0013792 A1* | 1/2008 | Houllier et al. | 382/113 |
| 2008/0040437 A1* | 2/2008 | Agarwal et al. | 709/206 |
| 2008/0102949 A1* | 5/2008 | Hasegawa et al. | 463/31 |
| 2008/0147610 A1* | 6/2008 | Mohanty et al. | 707/3 |
| 2008/0163123 A1* | 7/2008 | Bernstein | 715/853 |
| 2008/0204476 A1* | 8/2008 | Montague | 345/661 |
| 2008/0235610 A1* | 9/2008 | Dettinger et al. | 715/769 |
| 2008/0294986 A1* | 11/2008 | Seo et al. | 715/704 |
| 2009/0006154 A1 | 1/2009 | Hao et al. | |
| 2009/0027421 A1* | 1/2009 | Servan-Schreiber et al. | 345/661 |
| 2009/0076785 A1* | 3/2009 | Raviola et al. | 703/6 |
| 2009/0119640 A1* | 5/2009 | Ramsey et al. | 717/109 |
| 2009/0125342 A1* | 5/2009 | Reichhart | 705/7 |
| 2009/0216731 A1* | 8/2009 | Markovic | 707/4 |
| 2010/0064277 A1* | 3/2010 | Baird et al. | 717/120 |
| 2010/0064357 A1* | 3/2010 | Baird et al. | 726/6 |
| 2010/0223295 A1* | 9/2010 | Stanley et al. | 707/794 |
| 2010/0306672 A1* | 12/2010 | Arnold et al. | 718/1 |
| 2010/0332581 A1* | 12/2010 | Mills et al. | 709/202 |
| 2011/0065082 A1* | 3/2011 | Gal et al. | 434/365 |
| 2011/0078509 A1* | 3/2011 | Wolf et al. | 714/38.1 |
| 2011/0080341 A1* | 4/2011 | Helmes et al. | 345/163 |

OTHER PUBLICATIONS

U.S. Appl. No. 11/813,800, Non-Final Rejection, Whole Document Dec. 7, 2010.*
Bing search q=%28workflow%29+and+%28noncontrol%2 Sep. 4, 2014.*
Bing search q=(workflow+or+work$1flow)+and+(nonc Sep. 4, 2014.*
Bing search q=workflow%20group%20steps&qs=n&form May 27, 2015.*
Bing search q=workflow+edit+steps&src=IE—SearchB May 27, 2015.*
First Office Action and Search Report Issued in Chinese Patent Application No. 201110035132.4, Mail Date: Mar. 2, 2015, 15 pages.
Altintas, et al, "Kepler: An Extensible System for Design and Execution of Scientific Workflows", Retreived at<<http://citeseerx.ist.psu.edu/viewdoc/download?doi=10.1.1.119.2117&rep=rep1&type=pdf>>, Proceedings of the 16th International Conference on Scientific and Statistical Database Management (SSDBM'04), 2004, pp. 2.
Bajcsy, et al., "A Meta-Workflow Cyber-infrastructure System Designed for Environmental Observatories", Retreived at<<http://citeseerx.ist.psu.edu/viewdoc/download?doi=10.1.1.93.8058&rep=rep1&type=pdf>>, Technical Report: NCSA Cyber-environments Division, Dec. 30, 2005, pp. 1-30.

* cited by examiner

SIMPLIFIED USER CONTROLS FOR AUTHORING WORKFLOWS

BACKGROUND

Information Technology (IT), according to the Information Technology Association of America (ITAA), refers generally to the study, design, development, implementation, support, or management of computer-based information systems, particularly software applications and computer hardware. Most organizations of more than a handful of employees include an IT department responsible for a variety of tasks, including deployment of new computer hardware and applications, maintenance of one or more networks, monitoring of servers, and so forth. IT management applications, such as MICROSOFT System Center solutions, help organizations manage their IT environments, from physical to virtual, across desktops, devices, and datacenters. These applications are designed to provide a single window into IT services to allow proactive planning, deployment, management, and optimization across IT platforms. IT management applications capture and aggregate practical knowledge about infrastructure, policies, processes, and recommended practices so IT professionals can build manageable systems and automate operations to reduce costs, improve application availability, and enhance service delivery.

A common task in an IT department is the creation of scripts and workflows that help the IT department to automate some of its functions. For example, IT personnel may want to automate the steps involved in deploying new desktop computers for new employees, or the steps involved in deploying new servers to a data center. Today, IT personnel use a process to create these workflows that closely resembles computer programming. IT personnel often spend an extensive amount of time learning a particular scripting language, understanding control flow constructs (e.g., if, while, and goto statements), and understanding error and exception handling.

Although a programming environment provides a powerful environment for automation, the environment often does not map well to the way people think about IT problems. Many existing tools for authoring workflows have a graphical look and feel that makes the IT personnel think using the tools will be as easy as making a flow chart. Unfortunately, the terminology and design flow take their cues from developer tools. This often leads to disappointment and frustration, which wastes time and takes the IT professional away from other productive tasks he/she could be completing.

One area that demonstrates this disconnect is how existing tools handle control blocks. A basic workflow is a sequence of steps, where each step performs some function (e.g., reboot computer, install software, and check for updates). Control Block is the term that refers to a class of workflow controls that change a normal sequential flow of a workflow. For example, an IF/ELSE control block will change the flow of a workflow depending on some condition being true or false. Other examples of control blocks include FOR EACH, DO-UNTIL, WHILE, and TRY-CATCH. The typical experience includes the author placing one of these control blocks onto a design surface and then adding a sequence of steps that the control block influences within the control block's shape. This forces the author to first think about the workflow's control and then think about the work that needs to be done. This is similar to a developer's experience while developing code. First, the developer declares a control block (a loop for example), and then (in languages such as C++, C#, JavaScript, and Java) the developer places the lines of code within curly braces. However, many workflow authors (particularly those that have not had experience developing software or scripts) think instead about the work that needs to be done and then they go back and think about the control flow.

Another example of this disconnect is how error handling is authored. Traditional authoring environments have the main workflow and error handling workflows in different, disconnected views. The author views either the main workflow or the error workflow. While this is fine for a developer who develops using text, for an IT professional authoring a workflow visually, this is very difficult. Often what goes into the error handling workflow is determined by what is in the main workflow.

SUMMARY

A workflow design system is described herein that provides user interface controls that allow a workflow author to focus on the steps of the workflow before deciding on how to control the flow of the workflow. With the system, an author can change the control flow of a workflow without re-ordering the sequence of steps within the workflow. Traditional workflow authoring environments force the author to add a control block and then plan a sequence of steps within it. In contrast, the workflow design system allows the author to define a sequence of steps and then drag a control block over these steps to capture them within the control block. The author can also later remove the control block without affecting the sequence of steps if his needs change. In addition, the system presents error-handling workflows side-by-side with the main workflow, so that the author can modify the main workflow and notice the effects and any corresponding changes for error handling workflows at the same time. Thus, the workflow design system allows workflow authors to design workflows in a way more closely aligned with how authors think about the problem to be solved and less like a programming model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
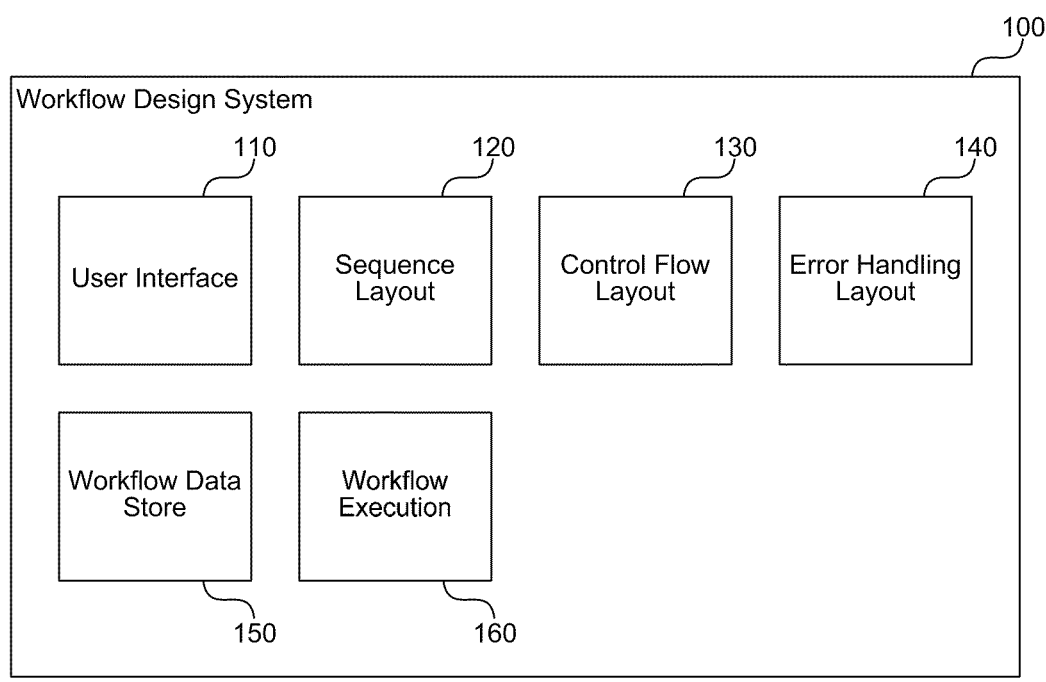
FIG. 1 is a block diagram that illustrates components of the workflow design system, in one embodiment.

A workflow design system is described herein that provides user interface controls that allow a workflow author to focus on the steps of the workflow before deciding on how to control the flow of the workflow. With the system, an author can change the control flow of a workflow without re-ordering the sequence of steps within the workflow. In addition, the system presents error-handling workflows side-by-side with the main workflow, so that the author can modify the main workflow and notice the effects and any corresponding changes for error handling workflows at the same time. In one example, the system receives a set of steps from an author that define a single instance of a task to be automated. For example, the set of steps may prepare a desktop computer for deployment. At any time, the system can receive a control flow that affects the set of steps from the author. For example, the author can capture a sequence of instructions into a control block by visually dragging the control block over the sequence of steps.

Traditional workflow authoring environments force the author to add a control block and then plan a sequence of steps within it. In contrast, the workflow design system allows the author to define a sequence of steps and then drag a control block over these steps to capture them within the control block. The author can also later remove the control block without affecting the sequence of steps if his needs change. In this way, an author can quickly take a sequence of steps designed to perform one task, and, for example, apply the sequence in a loop to perform the task on many computer systems (e.g., updating each of the computers in an organization). In addition, the author can add error handling to a sequence of steps by selecting the sequence of steps to which an error handler is applied. Thus, the workflow design system allows workflow authors to design workflows in a way more closely aligned with how authors typically think about the problem to be solved and less like a programming model.

Many types of workflow design actions are easier using the workflow design system. A few examples are:

1. Capturing a sequence of instructions into a control block. Traditional workflow authoring environments force the author to add a control block and then plan a sequence of steps within the control block. With the workflow design system, the author can first define a sequence of steps and then drag a control block over these steps to capture them within the control block.

2. Extend a control block to additional steps of a sequence. Traditional workflow authoring environments force the author to drag additional steps into a control block. With the workflow design system, the author can resize the control block to capture additional steps in the sequence of the workflow.

3. Shrink a control block to remove steps of a sequence. Traditional workflow authoring environments force the author to drag steps out of a control block and re-insert them elsewhere in the workflow's sequence of steps. With the workflow design system, the author can shrink the scope of the control block by visually resizing the control block.

4. Remove a control block from a set of steps in a sequence. Traditional workflow authoring environments remove all contained steps when an author deletes a control block. With the workflow design system, the author can remove the control block while maintaining the sequence of steps, as the control block is a separate visual entity in the designer.

5. Add error handling to any sequence of steps. Traditional workflow authoring environments force the author to add the error handler and then put the steps that will be checked for errors into the error handler. With the workflow design system, the author can select the sequence of steps to be checked for an error by creating an error handler around them.

6. Viewing the error handler along with the main workflow. Traditional workflow authoring environments show the main workflow and the error handling workflows on two separate screens. With the workflow design system, the author can design the main workflow and error handling workflows side-by-side.

In some embodiments, the workflow design system provides a designer application that includes a design surface on which authors can place various workflow controls. The author generally selects an action from a library of actions and drops the action onto the design surface as a step in a workflow sequence. The author can re-arrange steps within the sequence by dragging them and dropping them into a different location in the sequence. The author can also drag control blocks onto the design surface. Control blocks can have steps placed within them. Placing steps inside a control block submits the behavior within the sequence to the control of the control block. For example, if the block is a loop, the sequence of steps within the loop will repeat until the exit condition of the loop is met.

Although the designer may support a traditional way of putting steps within a control block, the designer used by the workflow design system also allows the author to place a control block on top of a step or sequence of steps to capture that sequence within the control block. The author can drag boundaries of the control block larger to capture additional steps or smaller to release contained steps. If the author decides that the control block is no longer needed, she can remove the control block without removing the steps the control block surrounds. Instead of being a container, the control block becomes more like an overlay, allowing the workflow author to focus on the sequence of steps and the control flow separately.

FIG. 1 is a block diagram that illustrates components of the workflow design system, in one embodiment. The system 100 includes a user interface component 110, a sequence layout component 120, a control flow layout component 130, an error handling layout component 140, a workflow data store 150, and a workflow execution component 160. Each of these components is described in further detail herein.

The user interface component 110 provides an interface between a user and a designer application. The component 110 receives user input (e.g., from a keyboard, mouse, touch, and so forth) and displays effects of the received input in a visual display, such as on a monitor. The user interface component 110 displays a design surface on which the user can place controls managed by the other components described herein.

The sequence layout component 120 receives a sequence of workflow steps and lays the steps out as graphical block elements visually on a design surface. For example, the component 120 may display each step as a rectangular block with a text string that describes the workflow function of the block (e.g., start virtual machine). The steps may have a particular order, so that when executed one step occurs after another in the order they appear on the design surface (e.g., top to bottom or left to right). The user can modify the sequence of steps by manipulating the blocks through the user interface component 110. For example, a user might drag a block representing a new step into the sequence by selecting the step from a toolbox of available workflow steps. The user may also reorder or remove steps by manipulating the graphical block elements on screen.

The control flow layout component 130 manages a size and a position of one or more control block elements. A user may surround a sequence of steps with a control block element to indicate that the control block element affects the control flow of the surrounded sequence. For example, if a user wants to repeat a sequence of steps five times, then the user may surround the sequence of steps with a FOR control block element with a loop count set to five. The user can change the steps affected by the control block by graphically resizing the control block to surround fewer steps or more steps. Each step within the control block is affected by the control block when the workflow executes.

The error handling layout component 140 graphically displays one or more error handling workflows that are associated with one or more steps in the sequence of workflow steps. For example, a step that moves a file may have an associated error handling workflow that handles a condition of the file not being found at a source location. Error handling workflows may apply to a single step or to sequences of two or more workflow steps. The error handling component 140 displays error-handling workflows in a manner that allows the user to view the sequence of workflow steps contemporaneously with an error handling workflow associated with the sequence of steps. This allows the user to consider the main workflow and error handling workflow separately, but also to view relationships between the two and make changes that keep the two in sync.

The workflow data store 150 stores one or more workflows that a user has saved in the designer application. A user may work on a workflow during multiple sessions of the designer application, saving his progress to the workflow data store 150 between each session. The workflow data store 150 may also store completed workflows for use within an organization whenever the workflows are needed. The workflow data store 150 may include a file (e.g., an extensible language markup (XML) file), a database, a storage area network (SAN), a cloud-based storage service, and other methods of persisting data. The user interface component 110 may provide controls for opening workflows from and saving workflows to the workflow data store 150.

The workflow execution component 160 provides an execution environment for executing the steps of workflows. The workflow execution component carries out the purpose of each sequence of steps, control block element, and error-handling element to implement the user's intent as expressed through the workflow. The workflow execution component 160 may be run in a production environment to process completed workflows as well as within the designer application so that the use can debug workflows that the user is still designing.

The computing device on which the workflow design system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
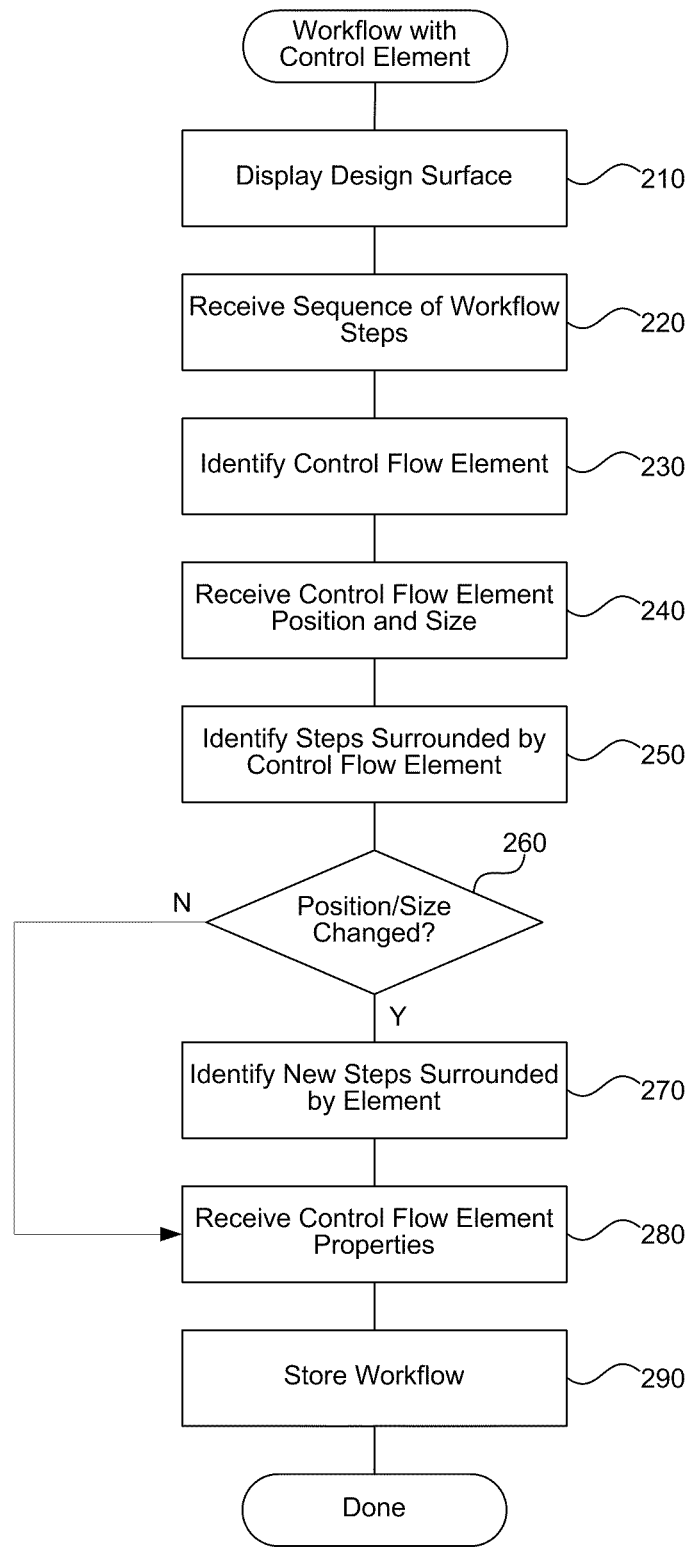
FIG. 2 is a flow diagram that illustrates processing of the system to define a workflow with a control flow element, in one embodiment.

FIG. 2 is a flow diagram that illustrates processing of the system to define a workflow with a control flow element, in one embodiment. Beginning in block 210, the system displays a design surface for visually defining a workflow. For example, the workflow author may run a designer application that implements the system described herein. The user interface of the application may include a window that displays the design surface to which the author can add workflow elements. Continuing in block 220, the system receives a sequence of steps from an author. For example, the author may drag step elements from a toolbox of predefined or custom workflow steps and drop the elements onto the design surface. The author may connect and/or order the steps in a manner that represents the sequence of steps that the author wants the system to perform.

Continuing in block 230, the system identifies a control flow element that the author has added to the design surface. For example, the author may drag a control flow element from a list of defined control flow elements and drop the control flow element onto the design surface. The user may also select the control flow element from a menu or other common user interface paradigm. The identified control flow element represents a particular type of control flow, such as a WHILE, IF, or FOR construct. Continuing in block 240, the system receives a position and size associated with the identified control flow element. For example, the designer application may maintain data structures with the position and size of each element on the design surface.

Continuing in block 250, the system identifies one or more workflow steps that are visually surrounded by the identified control flow element based on the received position and size. For example, the designer application may draw the control flow element as a rectangle on the design surface and the rectangle may encompass other rectangles representing workflow steps. These are the steps that are affected by the control of the control flow element. Continuing in decision block 260, the system determines whether the position or size of the identified control flow element has changed. If the position or size has changed, such as due to a user resizing the control flow element, then the system continues at block 270, else the system jumps to block 280. Continuing in block 270, the system identifies a new sequence of steps that are visually surrounded by the identified control flow element based on the changed position or size. For example, the author may have expanded the control flow element rectangle to encompass an additional workflow step.

Continuing in block 280, the system optionally receives properties associated with the identified control flow element.

For example, the author may provide a loop variable, iteration variable, or other data specific to a particular control flow element. Continuing in block 290, the system stores the workflow to a data store. For example, the system may save the design surface and its contents to a file for later processing (e.g., executing the workflow or receiving further modifications). After block 290, these steps conclude.

Figure 3:
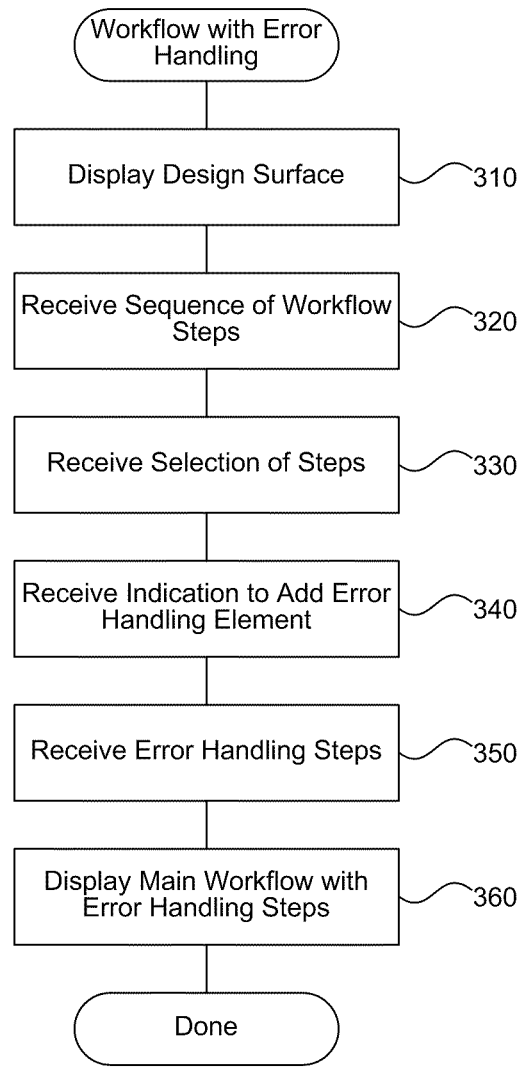
FIG. 3 is a flow diagram that illustrates processing of the system to define a workflow with an error-handling element, in one embodiment.

FIG. 3 is a flow diagram that illustrates processing of the system to define a workflow with an error-handling element, in one embodiment. Beginning in block 310, the system displays a design surface for visually defining a workflow. For example, the workflow author may run a designer application that implements the system described herein. The user interface of the application may include a window that displays the design surface to which the author can add workflow elements. Continuing in block 320, the system receives a sequence of workflow steps from an author. For example, the author may drag step elements from a toolbox of predefined or custom workflow steps and drop the elements onto the design surface. The author may connect and/or order the steps in a manner that represents the sequence of steps that the author wants the system to perform.

Continuing in block 330, the system receives a selection of one or more workflow steps within the received sequence of workflow steps to which to associate an error handling sequence. For example, the author may graphically select one or more workflow steps by clicking on the steps or dragging a box around the steps. Continuing in block 340, the system receives an indication to add an error-handling element to the received selection of one or more workflow steps. For example, the author may right click the selected steps or select an error handling option from a menu of the designer application. Alternatively or additionally, a container of a group of steps may include an icon (e.g., an "E") that the author can click to add error handling (see, e.g., FIG. 7).

Continuing in block 350, the system receives one or more error handling steps that comprise the error handling sequence. For example, the author may add one or more workflow steps that roll back the actions of the main workflow sequence when a workflow step fails. The error handling sequence can contain workflow steps similar to the main workflow, but may also include error-related steps designed for error handling. Continuing in block 360, the system displays the received sequence of workflow steps and the received error handling sequence so that both are visible on the design surface at the same time. Previous systems make it difficult to view both a workflow and the error handling for the workflow. The workflow design system can display the error handling sequence side-by-side with the main workflow, or in another manner that allows the author to maintain the workflow more easily. After block 360, these steps conclude.

Figure 4:
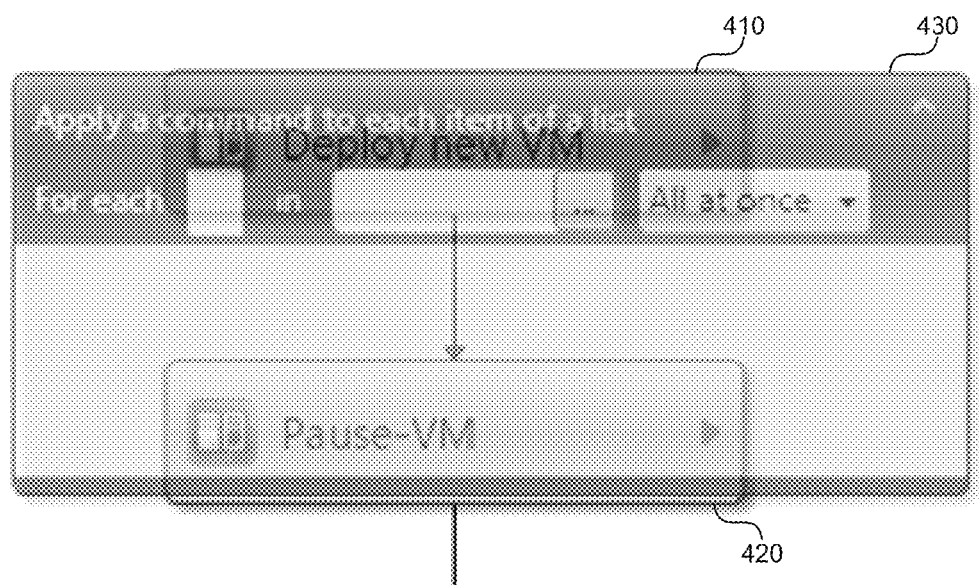
FIG. 4 is a display diagram that illustrates a display of the workflow design system for capturing or releasing a step in a workflow sequence, in one embodiment.

FIG. 4 is a display diagram that illustrates a display of the workflow design system for capturing or releasing a step in a workflow sequence, in one embodiment. The display includes a first workflow step 410 labeled "Deploy new VM" and a second workflow step 420 labeled "Pause-VM." The first workflow step 410 and second workflow step 420 define a sequence of steps that performs a complete workflow to deploy a virtual machine and pause execution of the virtual machine. In the display, an author is dragging a control flow element 430 to add a FOR loop around the first workflow step 410, so that the workflow will perform the "Deploy new VM" step multiple times. The author simply drags the control flow element over the desired workflow steps. In particular, the author was able to completely define a sequence of steps before thinking about control flow and can now think about control flow and add the control flow element.

Figure 5:
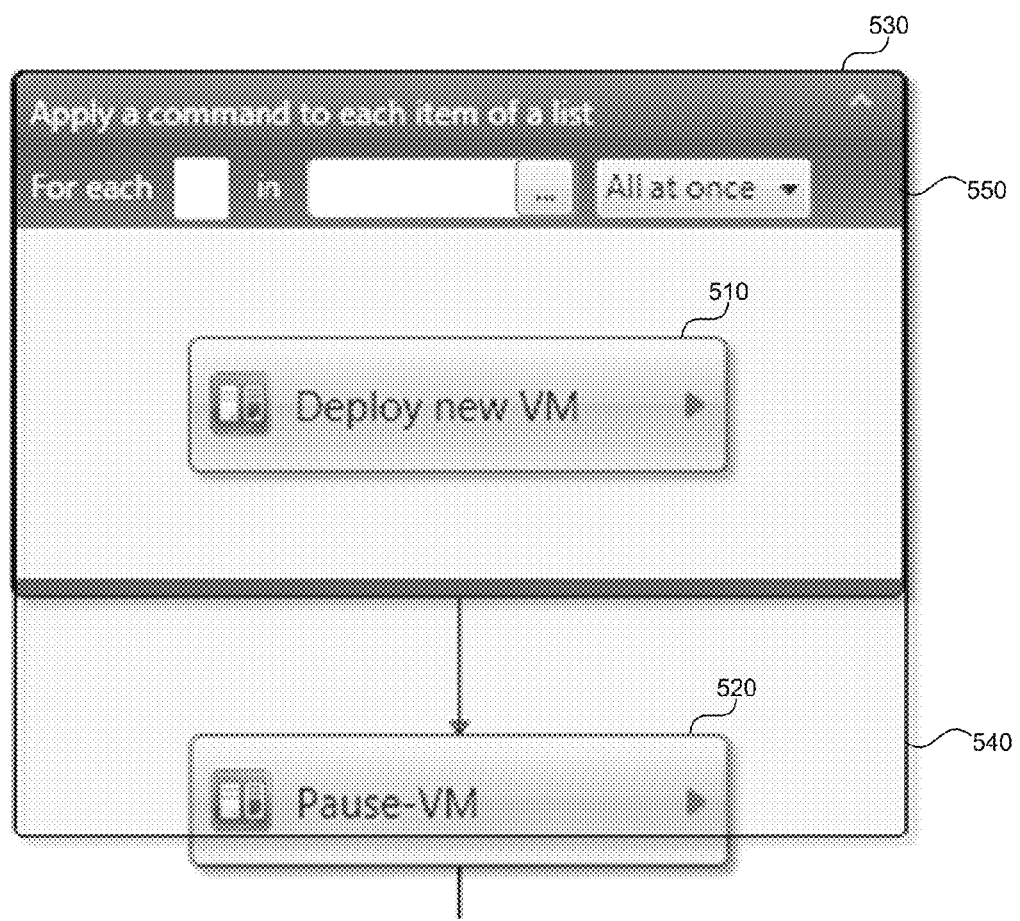
FIG. 5 is a display diagram that illustrates a display of the workflow design system for extending or shrinking a control to include additional steps in a workflow sequence, in one embodiment.

FIG. 5 is a display diagram that illustrates a display of the workflow design system for extending or shrinking a control to include additional or fewer steps in a workflow sequence, in one embodiment. The display includes a first workflow step 510 labeled "Deploy new VM" and a second workflow step 520 labeled "Pause-VM" similar to those of FIG. 4. The first workflow step 510 and second workflow step 520 define a sequence of steps that performs a complete workflow to deploy a virtual machine and pause execution of the virtual machine. A control flow element 530 representing a FOR loop currently surrounds the first workflow step 510, so that the workflow will perform the "Deploy new VM" step multiple times. The author is resizing the control flow element 530 by dragging the bottom half 540 to encompass the second workflow step 520. Thus, after the author's action is complete, the FOR loop will include both workflow steps, so that both steps will be performed multiple times in the workflow. Similarly, the author could drag the bottom half 540 to reduce the steps encompassed by the control flow element 530 (e.g., if the workflow step 510 was a sequence of more than one step). The control flow element 530 also includes a properties area 550 in which the author can define the characteristics of the FOR loop or other control variables. For example, the author may define an iteration variable that increases with each successive loop, and a stop variable or condition that defines the exit criteria of the control flow element 530.

Figure 6:
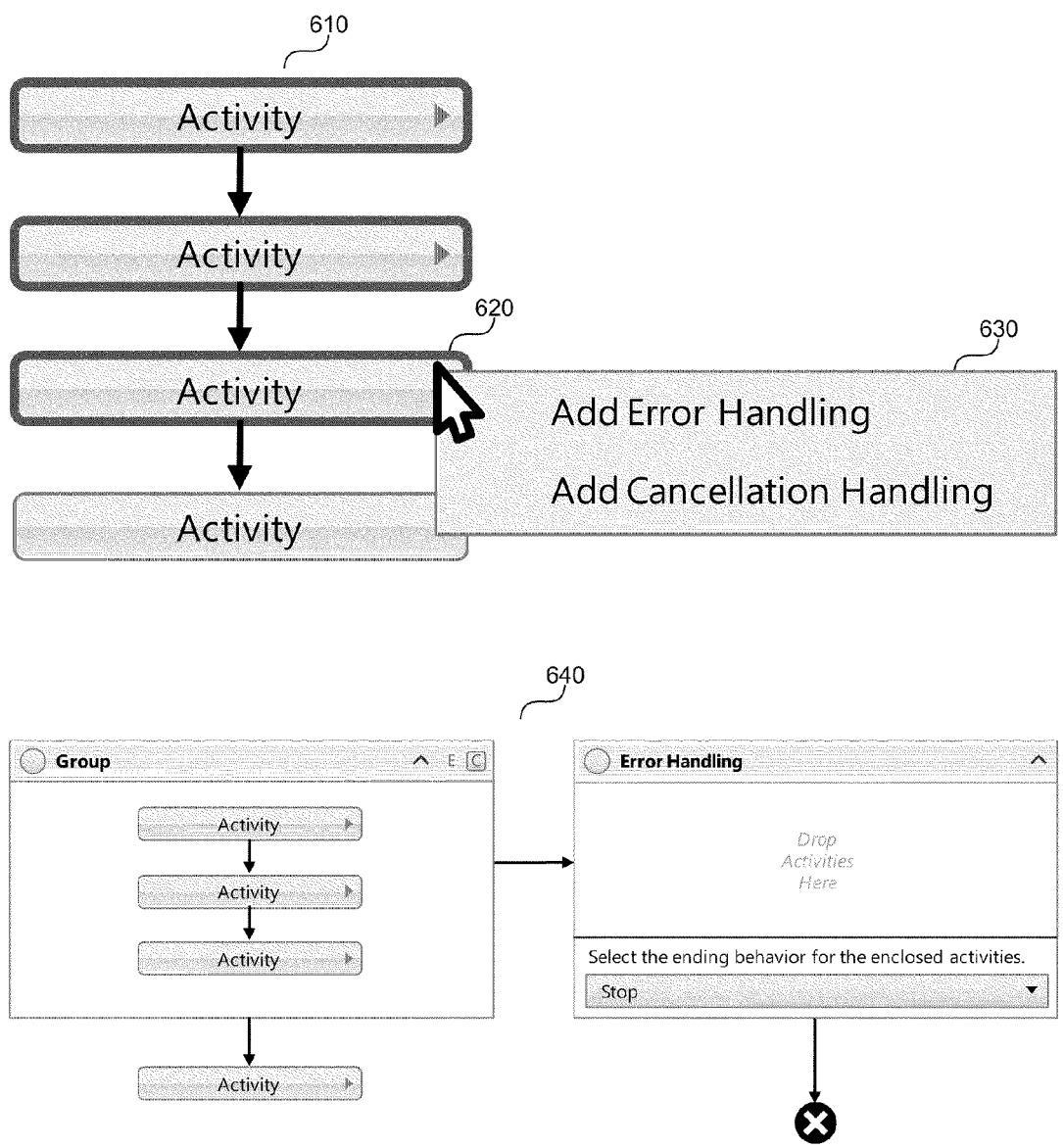
FIG. 6 is a display diagram that illustrates a display of the workflow design system for adding error handling to steps to a workflow sequence, in one embodiment.

FIG. 6 is a display diagram that illustrates a display of the workflow design system for adding error handling to steps to a workflow sequence, in one embodiment. The display includes a sequence of steps 610, each generically labeled "Activity." Each step performs a particular workflow step that carries out an action desired by the author of the sequence of steps 610. In the display, the author has clicked on a particular workflow step 620 after selecting the first three steps (indicated by the darker border) and has invoked a context menu 630 (e.g., by right clicking or selecting a context menu keyboard shortcut). The context menu 630 provides an option for adding error handling to the selected workflow steps. The author can select multiple contiguous activities and the system will overlay error handling on top of the steps represented by the activities. This overlay can be grown, shrunk, or removed as any other control flow overlay. The display 640 illustrates the effect of adding error handling to the selected three workflow steps. A group is placed around the three steps and the error handling sequence is attached to the group.

Figure 7:
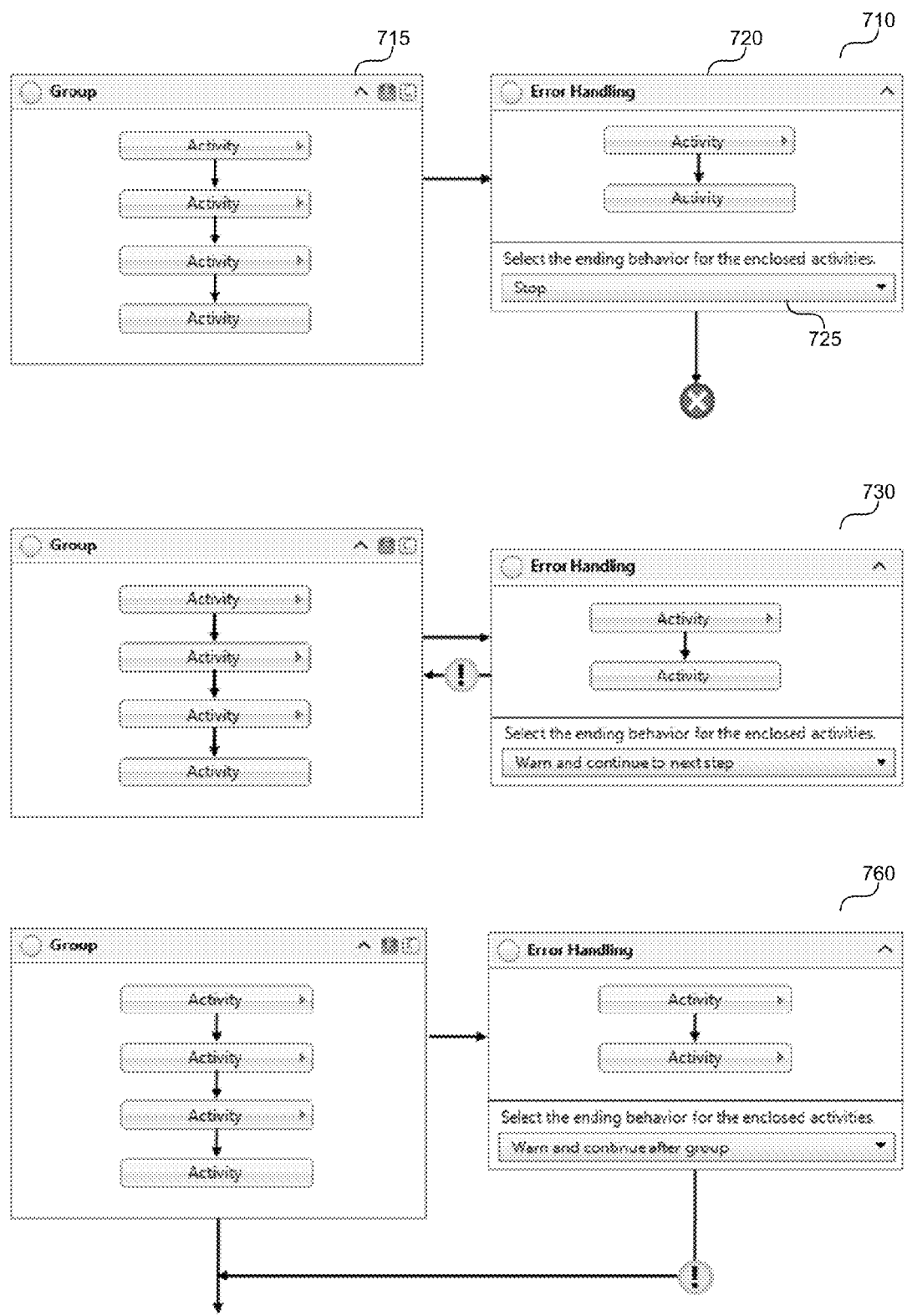
FIG. 7 is a display diagram that illustrates three displays of the workflow design system for viewing error handling side-by-side with a main workflow, in one embodiment.

FIG. 7 is a display diagram that illustrates three displays of the workflow design system for viewing error handling side-by-side with a main workflow, in one embodiment. The first display 710 includes a group 715 or workflow steps. Sequences of workflow steps can be grouped for common error handling, common control flow, or other manipulations that affect multiple steps in the same way. The first display 710 also includes an error handling sequence 720. The error handling sequence 720 defines steps that the execution environment of the system will perform if an error occurs while executing the group 715 of workflow steps. The error handling sequence 720 also includes an ending behavior selection 725 that defines what the execution environment will do after performing the steps of the error handling sequence 720. In the first display 710, the system performs the error handling sequence 720 and then stops. In the second display 730, the system performs the error handling sequence 720 and then continues to the step within the group 715 after the one in which the error occurred. In the third display 760, the system performs the error handling sequence 720 and then continues to whatever step or group follows the group 715. Note that the main workflow illustrated by the group 715 and the error handling sequence 720 are displayed side by side so that both are visible to the workflow author. The author can also visually determine the flow of the steps if the error handling occurs.

In some embodiments, the workflow design system displays descriptive control structure text for control flow elements. For example, as shown in FIGS. 4 and 5, a FOR control flow element may include text that says, "for each <blank> in <blank>," where <blank> refers to a variable for the author to fill in. By displaying the control flow properties to the user in a manner more like a sentence than like a programmatic construct, the system reinforces to the author the ease of using control flow elements with the system.

In some embodiments, the workflow design system provides a visual indication that indicates something for the author to finish in a workflow. For example, a "Start Virtual Machine" step may have a property that defines which virtual machine to start. Until the user sets the property, the step may have a red exclamation point or other visual indicator in the designer view that indicates a problem. As another example, if a user removes a control flow element and steps within the sequence reference a variable defined by the control flow element, the sequence or individual steps may indicate the error visually.

Figure 8:
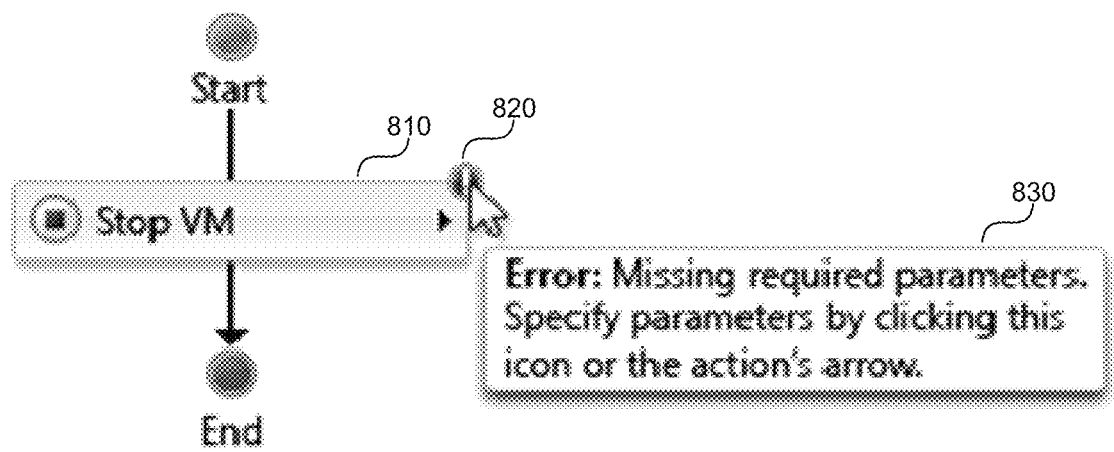
FIG. 8 is a block diagram that illustrates a workflow step with an error for the author to correct, in one embodiment.

FIG. 8 is a block diagram that illustrates a workflow step with an error for the author to correct, in one embodiment. A workflow step 810, labeled "Stop VM" has an associated error icon 820 that indicates a problem with the workflow step 810. Upon hovering over the error icon 820, the author may receive balloon text 830 that describes the problem in more detail. For example, in this example the balloon text 830 indicates that the author needs to add parameters to the step to resolve the error. The author can click the arrow on the workflow step 810 or click the error icon 820 to view a parameters dialog box or property sheet for adding the missing parameters.

From the foregoing, it will be appreciated that specific embodiments of the workflow design system have been described herein for purposes of illustration, but that various modifications may be made without deviating from the spirit and scope of the invention. For example, although an IT environment has been used in examples, the system can be applied to other environments where workflows are defined for various purposes. Accordingly, the invention is not limited except as by the appended claims.

We claim:

1. A computer-implemented method for defining a workflow visually, the method comprising:
    displaying a design surface for visually defining a workflow;
    receiving a sequence of non-control flow steps from a workflow author that define a workflow;
    identifying a control flow element that the author has added to the design surface, wherein a control flow element refers to a class of workflow controls that change a normal sequential flow of a workflow;
    receiving a position and a size associated with the identified control flow element;
    identifying one or more of the received non-control flow workflow steps that are visually surrounded by the identified control flow element based on the received position and size;
    determining whether the position or size of the identified control flow element has changed;
    in response to determining that the position or size of the identified control flow element has changed, identifying a new sequence of the received non-control flow steps that are visually surrounded by the identified control flow element based on the changed position or size, such that control flow of a workflow is not visually displayed within the sequence of non-control flow steps and can be edited without editing the non-control flow steps; and
    storing the workflow to a data store,
    wherein the preceding steps are performed by at least one processor.

2. The method of claim 1 wherein displaying the design surface comprises receiving a request from a workflow author to run a designer application.

3. The method of claim 1 wherein displaying the design surface comprises displaying a user interface of an application that includes a window that displays the design surface to which a workflow author can add workflow elements to perform steps of a workflow.

4. The method of claim 1 wherein receiving the sequence of steps comprises adding each step as an element to the displayed design surface.

5. The method of claim 1 wherein receiving the sequence of steps comprises receiving a step element dragged from a toolbox of predefined or custom workflow steps and dropped onto the design surface.

6. The method of claim 1 wherein receiving the sequence of steps comprises receiving an order for the steps that defines the sequence of steps that the author wants the workflow to perform.

7. The method of claim 1 wherein identifying a control flow element comprises detecting that the author has selected a control flow element from a list of defined control flow elements and placed the control flow element onto the design surface.

8. The method of claim 1 wherein identifying one or more workflow steps that are visually surrounded comprises identifying a rectangle of the control flow element on the design surface and determining rectangles representing workflow steps encompassed by the rectangle of the control flow element.

9. The method of claim 1 wherein identifying a new sequence of steps that are visually surrounded comprises determining that the author expanded the control flow element to include an addition workflow step.

10. The method of claim 1 wherein identifying a new sequence of steps that are visually surrounded comprises determining that the author reduced the size of the control flow element to exclude a previously included workflow step.

11. The method of claim 1 wherein identifying a new sequence of steps that are visually surrounded comprises determining that the author removed the control flow element leaving the sequence of steps on the design surface.

12. The method of claim 1 further comprising receiving properties associated with the identified control flow element that modify behavior of the control flow element upon execution of the workflow.

13. A computer system for simplified designing of information technology workflows, the system comprising:
    a processor and memory configured to execute software instructions;
    a user interface component configured to provide an interface between a user and a designer application running on the computer system, wherein the designer application displays a design surface on which the user can place controls;
    a sequence layout component configured to receive a sequence of non-control flow workflow steps and lay the steps out as graphical block elements visually on the design surface;

a control flow layout component configured to manage a size and a position of one or more control block elements, wherein the user can surround a sequence of non-control flow steps with a control block element to indicate that the control block element affects the control flow of the surrounded sequence, wherein a control block element refers to a class of workflow controls that change a normal sequential flow of a workflow, such that control flow of a workflow is not visually displayed within the sequence of non-control flow steps and can be edited without editing the non-control flow steps;

an error handling layout component configured to graphically display one or more error handling workflows that are associated with one or more steps in the sequence of workflow steps and are not placed sequentially within the sequence of workflow steps; and a workflow data store configured to store one or more workflows that a user has saved in the designer application.

14. The system of claim 13 wherein the sequence layout component is further configured to display each workflow step as a rectangular block with a text string that describes the workflow function of the block, and to display the steps in an order so that when executed one step occurs after another in the order they appear on the design surface.

15. The system of claim 13 wherein the control flow layout component is further configured to enable the user to change the steps affected by the control block by graphically resizing the control block to surround fewer steps or more steps.

16. The system of claim 13 wherein the error handling layout component is further configured to display error handling workflows in a manner that allows the user to view the sequence of workflow steps contemporaneously with an error handling workflow associated with the sequence of steps.

17. The system of claim 13 further comprising a workflow execution component configured to provide an execution environment for executing the steps of a workflow designed with the designer application.

* * * * *